United States Patent Office 2,875,555
Patented Mar. 3, 1959

2,875,555

SHIELDING PLANTS FROM FROSTATION BY USE OF FOAM

Bernard J. Thiegs and Norman Wright, Midland, Mich., assignors to The Dow Chemical Company, Midland, Mich., a corporation of Delaware No Drawing. Application January 23, 1957
Serial No. 635,618

6 Claims. (Cl. 47—2)

This invention relates to the use of foam in protecting plants from frost damage.

Frost damage to various horticultural installations is oftentimes responsible for serious losses. Perdition of valuable fruit, vegetable and other crops may frequently be attributable to the irreparable injury that has been occasioned by inopportune and severe frostation. Sometimes, even delicate trees and other perennial bearing plants are spoliated by this phenomenon.

Certain conventional measures are sometimes invoked to combat the settling of a frost on vulnerable stands of fruit and vegetable plants. These may include physically covering the plants with cloth, sheets or films to conserve heat; generating smudge and the like to provide heat; and mixing or stirring the air by forced circulation to equalize thermal conditions in the atmosphere. Orchardists, for example, are often inclined to indulge in such practices although the same or similar procedures are not entirely foreign to olericulturists, and other growers. The known techniques that have been designed to thwart the dire consequences of frost may be more or less beneficial, depending upon a complexity of conditions and circumstances attendant their use. Many times, they may prove to be quite successful. Nonetheless, it would be highly advantageous for a novel, expedient and highly efficacious means and method to be available for preventing frost damage to botanical plants, particularly those of commercial interest in horticulture.

To the realization of these desiderations and the attainment of corollary ends, therefore, this invention has reference. It has among its principal objectives and purposes the provision a facile and beneficial method wherein the foregoing intendments may be secured by utilization of a protective, insulating foam layer or blanket that has been spumed from an aqueous, foam-providing composition to envelope the plants during periods, especially during overnight periods, when frostation is likely to occur.

Accordingly, botanical plants, especially fruit trees, vegetables and other desired plant growths may advantageously be shielded from frostation whenever it is imminent by a method which comprises covering or blanketing the plants with an enveloping layer of a stable, long-lasting foam that is non-toxic and otherwise non-deleterious to the particular plant life involved and which has been generated from an aqueous, foam-providing composition.

Advantageously, the foam-providing composition and the foam generated therefrom may comprise water and a minor proportion of a water-soluble polymeric material that is mechanically spumiferous in aqueous solution to provide plenteous quantities of foam that may either inherently be relatively stable and long-lasting, or which may be rendered so by the incorporation of one or more suitable foam stabilizing ingredients and additaments in the composition. Generally, it is necessary for the foam to remain in place for relatively long periods, oftentimes as long as overnight. Hence, the compositions that are employed must usually be adapted to provide stable foams that have a life (or a life expectancy) of at least about four hours under conditions of outdoor exposure. It is frequently preferable to utilize foams that persist for at least eight to twelve hours. Several water-soluble polymeric materials, including various proteinous substances, are adapted to be utilized in and for compositions having the indicated desirable characteristics. It is of particular benefit, however, to employ foam-providing compositions to generate the plant protecting foams in the practice of the present invention which are in general accordance with the compositions that have been disclosed by Bernard J. Thiegs in his copending application for U. S. Letters Patent covering Stable Foam Compositions having Serial No. 634,196, which was filed on January 15, 1957. Thus, it is highly advantageous to use the exceptionally stable and lasting foams that have been generated from spumescent aqueous compositions containing minor proportions of saponin and a long chain, water-soluble, non-proteinous polymeric material that is selected from the group consisting of non-polar cellulose ether derivatives that are adapted to provide one per cent by weight aqueous solutions having surface tensions at room temperatures beneath about 60 dynes per centimeter; polyvinyl alcohol (including various of its hydrolyzed forms); polyvinylpyrrolidone; water-soluble copolymers of vinyl pyrrolidone; hydrolyzed polyacrylonitrile; copolymers of vinyl acetate and maleic acid; copolymers of vinyl methyl ether and maleic anhydride, and mixtures thereof. The cellulose ether derivatives that are employed may contain various alkyl or alkoxy etherifying substituents, or combinations thereof, that, advantageously, are not comprised of more than about four carbon atoms in their structures. As the term is conventionally employed by those who are skilled in the art, and as it is herein intended to be construed, non-polar cellulose ether derivatives are those which are substantially devoid of strong polar substituents and which are relatively non-polar in comparison to the cellulose ether derivatives that are usually considered to be relatively polar, such as the sodium salts of carboxy-methyl cellulose.

The expectable life of foam structures that have been generated from such spumescent compositions is invariably greater than about four hours. Quite often, it is found to be in excess of eight or twelve hours, especially when cellulose ether derivative or polyvinylalcohol compositions are employed. When a cellulose ether derivative is utilized, better results are generally obtained with low viscosity grades of the ether. Eminently satisfactory results may invariably be obtained when a methyl cellulose ether is employed that has an average molecular chain length of such an order of magnitude that the absolute viscosity of a two per cent by weight aqueous solution of the ether at 20° C. is less than about 100 centipoises. Cellulose ether derivatives of the last-mentioned type are frequently considered and designated as being in the low viscosity range. They most often are found to have an average of between 1.5 and 2.0 methoxy groups per each recurring glucose unit in the cellulose molecule. Such a material may suitably be similar to that which is obtainable under the trade-names "Methocel" or "Methocel HG" from The Dow Chemical Company of Midland, Michigan.

In many cases, other foam-providing substances, including water-soluble proteinous substances, may also be employed suitably. Thus, protein-type foams that are prepared from gelatin and from such compositions as are typified by "3 percent liquid foam," a proteinous foam-generating material that is commercially available from The National Foam Company, may be utilized as may other foam-providing substances.

The concentration of the water-soluble polymer or other foam-providing substance that is employed in the aqueous foam-providing compositions that are utilized in the practice of the invention may be varied to best suit the spuming characteristics and properties of the particular polymer or other substance that is involved. Generally, however, a water solution containing less than about 10 percent by weight of any foam-providing polymer or other substance will be found suitable for the intended purpose. Conventional and known amounts of various foam-stabilizing additaments may be incorporated in the compositions whenever their use is necessary or advantageous. When saponin-containing compositions in accordance with the referred-to disclosure of Thiegs are employed, the concentration of the water-soluble polymer may, for example, be from about 0.25 to 5 percent by weight, based on the weight of the composition, and that of the saponin from about 0.5 to 10 percent by weight. Usually, however, spumiferous compositions and the foams generated therefrom that contain and are stabilized with saponin may be employed with the greatest efficacy when their content of the long-chain, water-soluble, non-proteinous polymer is in the range from about 0.75 to 2 percent by weight, based on the weight of the composition, and an amount of the saponin in the range from about 0.1, preferably from about 0.25 to about 1 percent by weight is incorporated therein. While the relative degree of stability of a foam that has been generated from a saponin stabilized composition depends to a great extent upon the relative proportion of saponin that is incorporated in the composition, a highly suitable ratio of the saponin to the long-chain, water-soluble polymeric material is frequently found to be in the neighborhood of 0.25 to 1 part by weight of the former for each part by weight of the latter that is employed in the composition, especially when the latter polymer is a methyl ether of cellulose. It is ordinarily desirable to employ a foam-providing composition that has an expansion potential when generated into foam of at least about 10, and, preferably, at least about 30 up to as much as about 200 or more, times by volume by whatever spuming technique is employed. Obviously, more greatly expanded foam provides among other benefits the advantage of greater economy in use of the spumescent composition from which it is generated.

Various techniques may be employed for spuming the foam-providing compositions into the stable foams that are applied over the plants to shield them from frostation in the practice of the present invention. It is generally preferable and most expedient to generate the foams by means of mechanical spuming techniques that are adapted to provide excellent, three-dimensional foam structures from the aqueous compositions. Thus, pneumatic or bubbling techniques may be employed with great suitability and practicality. Many foam-generating appliances are well suited to simultaneously manufacture the foam and direct it in a copious stream for deposit in the intended application thereof. By way of illustration, excellent foams may be generated by spraying the composition against a foraminulous barrier (such as a cloth or screen having a size of about 100 mesh in the U. S. standard sieve series) through which a current or blast of air or other desired gas is being simultaneously and unidirectionally forced. Voluminous foam products may be made to issue and to be directed continuously from the downwind side of such a device by the obvious bubble generating action of the air blast which pushes and expands the enfilmed composition through the foraminula in the barrier.

It is generally advantageous to envelope the plant to be shielded with a spumous layer of the foam having an average thickness of at least about half an inch. In many cases, a foam blanket of two to three inches may be preferable. Of course, the precise thickness of the foam layer that is best to employ depends to a great extent upon the severity of the anticipated frost and to some extent upon such other influences as the wind which may exert a greater or lesser drying influence on the deposited foam in somewhat direct proportion to its velocity. It also depends to a great extent upon the size of the bubbles that are present in the foam. A greater plurality of smaller bubbles in a given thickness of foam usually provides superior insulating value and protection. Although single bubble layer foams, when they are suitably stable, are not without benefit, it may frequently be advantageous to utilize foam blankets that comprise plural layers or thicknesses of individual bubbles in the foam. It is usually unnecessary and impractical for the thickness of the foam blanket that has been applied over the plants to be in excess of about six inches.

When the foam is applied to cover vegetables and other low plants, it is ordinarily preferable for the blanket to entirely surround the plant or plants and to contact the ground while accomplishing the protective envelopment. The same manner of application can also be achieved with trees, if desired. However, it may oftentimes be satisfactory for the foam cover to merely envelope the delicate and frost-susceptible foliage of the trees, including the blossoms, fruit buds or any fruit that may be involved, without actually contacting the ground in order to serve the intended purpose. And, if only a light frost is anticipated, it may suffice to merely spread the foam blanket over the tops of the plants or trees being protected in a canopy like fashion. In this connection, the foam that is employed should have suitable characteristics of rigidity, coherence and bridging potential to make possible its use in a satisfactory manner in the practice of the invention. As is apparent, the foam should have a pronounced tendency to be self-supporting and relatively non-flowing. These features enable it to readily fill and occupy the voids, cavities and other interstitial spaces between the branches and foilage of the plants being covered. As a general rule, the rigidity of a given foam will be found proportional to its "tightness" and the fineness of its component bubbles.

As mentioned, the protective and insulating foam blanket or cover is applied over the plants when danger of frost is imminent. In this connection, as is well known, it is not necessary for freezing temperatures to be anticipated in order to give rise to concern over the occurrence of frostation. Due to the effects of thermal radiation, freezing and frost injury can often be observed in plants when they have been exposed to air temperatures during the night (or on unusually cloudy days) that are actually above 32° F. As is apparent, the applied foam blanket in the practice of the invention serves to prevent frostation and to protect the plants from injury during freezing conditions by not only preventing cold air from contacting the plants but by minimizing thermal radiation through the blanket to the atmosphere so as to effectively retain substantial proportions of the heat that is associated with the plant and in the surrounding earth from solar influences. The latter capability, in the final analysis, is probably of relatively greater import and significance. The effective heat retention that is provided by the aqueous foams used in the practice of the invention stems from their greatly predominant water content and the unusual ability of water to absorb and hinder infra-red radiation. As is known, essentially all of the heat that radiates from the earth (and black bodies in general) does so in the form of energy in the infra-red portion of the spectrum. Thus, not only does the water in the foams permit them to be prepared with utmost economy in raw material requirements, but it also furnishes maximum insulating and heat conserving capabilities for them in their intended application. The usual plastic materials, such as most of those that are commonly available in the sheet and film form, offer much less resistance to the passage of infra-red energy than does water.

The applied foam blankets eventually decay and collapse by means of drainage, bursting and desiccation to leave the plant in an uncovered, natural condition. If a suitably long-lasting foam has been employed, its dissipation will usually not occur until danger of frost is past. For example, a good stable foam that has been applied in the evening should last throughout the night until the following morning when the rising sun alleviates the further probabilities of frostation. Usually, all that remains of the applied foam after its eventual demise is a dry, skeletal, foam lamellae or fluffy residue that does not interfere with the functions or processes of the plant. Quite often, the residue will fall from the plant of its own accord, or in conjunction with wind action. It is usually certain to be washed off by rains. And, if it is desired to do so, the foam residue can be purposely washed off the plants by watering them after the foam has been applied and has afforded its saving influence to the plant. Of course, it will be quite obvious that the practice of the present invention is poorly adapted for utilization during rainy or excessively wet weather. In some cases, and under some circumstances, the foam covering of plants should also be avoided in a hot, bright sun, due to the stifling effect which may be caused.

The invention is further delineated in and by the following examples wherein, unless otherwise indicated, all parts and percentages are to be taken by weight. The experimental work which provides basis for the examples was all accomplished and performed at the indicated times in the immediate vicinity of Midland, Michigan, for which area of these United States there are existing official meteorological records.

*Example I*

A foam-providing composition was prepared by dissolving about 5.0 parts of purified soaproot extract saponin and 7.5 parts of methyl cellulose of the 15 centipoise (cps.) viscosity grade in 1000 parts of water. The solution was prepared by adding the dry ingredients to about one-third the total volume of water which had been separately heated. After about five minutes, the balance of the water was added at room temperature with continued stirring to achieve complete solution.

A very stable mechanical foam could be generated and directed for application from the solution by spraying it, in and through a duct, against a double layer of 100 mesh copper screen having a diameter of about one and three-eighths inches through which about 30 to 40 cubic feet per minute of air were being simultaneously forced by a high speed fan capable of producing a static pressure in a closed system equal to about a seventeen inch head of water.

On an evening in the fall when a frost was anticipated, several young cranberry bean plants (*Phaseolus vulgare* L. var. cranberry) were placed outside and completely covered with a mound of foam generated from the indicated composition in the indicated manner. The plants had an average height of about eight inches and the average thickness of the applied boam blanket was about three inches. The plants remained covered with the foam overnight. They were still covered with the foam on the following morning.

*Example II*

About twelve days subsequent to the events described in the first example, in accordance with the general procedure therein described, the following spumescent composition was employed for preparation of a stable foam:

Saponin, purified _____ 2.5
"Methocel" (10 cps.) _____ 7.5
Water _____ 1000

The foam generated from the composition was used to completely cover two pots of healthy, young cranberry bean plants which had been placed outside. The plants were in standard four-inch crockery pots, each of which contained about ten of the young plants which had an average height of about eight inches. The foam blanket that was mounded about the plants had an average thickness between about two and three inches. Two similar pots of healthy bean plants were left uncovered and placed outside as controls.

A severe frost occurred during the night with the temperature dropping to about 28° F. At eight o'clock the next morning, the four pots of bean plants were examined. The treated plants remained covered with foam and appeared to have suffered little, if any, injury from the frost. Both pots of the unprotected bean plants, however, were severely injured. They were estimated to contain half to three-quarters of dead bean plants that had succumbed to frostation.

*Example III*

At about 9:00 p. m. on an evening that was about thirty days after the activities related in Example I, several foam compositions were prepared and applied in the foregoing manner to several four-inch pots of young cranberry bean plants, each containing six to eight virile bean plants that were eight to ten inches high. The pots, arbitrarily designated "A" through "E" were placed outside. Pot "A" was used as a control while the remaining pots were covered with about two inches of foam in mounds about the plants that was spumed from the aqueous compositions indicated in the following tabulation:

| Pot | Foam Composition Applied Over Plants in Pot |
|---|---|
| "A" | None—control. |
| "B" | 0.10 percent Saponin. <br> 1.00 percent "Methocel (10 cps)". |
| "C" | 0.25 percent Saponin. <br> 1.00 percent "Methocel (10 cps)". |
| "D" | 0.50 percent Saponin. <br> 1.00 percent "Methocel (10 cps)". |
| "E" | 1.00 percent Saponin. <br> 1.00 percent "Methocel (10 cps)". |

A severe frost occurred during the night, with the temperature dipping to a low of about 29° F. At about 8:00 a. m. the following morning, the specimens were examined for evidences of frostation. All the plants in pot "A" were dead. Negligible injury was noted to the plants in pots "B" and "C," and it was observed that the uppermost portions of foam had started to break thereon. A thick foam covering remained over pots "D" and "E" and absolutely no frost injury could be detected in the plants therein.

*Example IV*

On the night following that described in Example III, the foregoing was repeated using two more pots of cranberry bean plants, similar to those used in Example III and four individually potted tomato plants, of the variety employed in Example V, each about four inches in height and in excellent condition. The foam that was employed was the same that was used on pot "C" in the third example. One of the bean and two of the tomato plant pots were left uncovered as controls. A frost occurred during the night which was slightly less severe than had been experienced one day previous. The next morning, however, both of the uncovered tomato plants were dead and all of the uncovered cranberry bean plants were observed to have been severely injured with frostbite. The average extent of frost damage to the uncovered plants was estimated to have been at about 50 percent. The foam protected bean and tomato plants remained in excellent and completely undamaged condition.

*Example V*

At about 8:00 p. m. on a spring evening when the temperature was about 42° F. and falling with imminent danger of frost, each of the plants in a 150 ft. row containing about thirty Bonny Best tomato transplants (*Lycopersicum esculentum* L. var. Bonny Best), having an average height of about four to six inches, was covered with a mound of foam similar to that used in the fourth example. The foam blanket enveloping each plant was about eighteen inches in mean diameter and several inches thick. It happened that an unusually heavy frost visited the area during the night, with a low temperature of about 24° F. being experienced. The foamed covered row of plants withstood the frost and remained in excellent condition. Very little, if any, apparent frost damage could be observed in the plants. In comparison, an identical control row of tomato transplants that had been purposely left uncovered during the same night were all dead the following morning.

On the same night, two flats of the tomato transplants were placed outside; one being covered with the foam; the other remaining unprotected. A minimum temperature indicating type of thermometer was placed in each flat adjacent to the plants. All of the plants in the uncovered flat were killed, with the adjacent, exposed thermometer showing that a low temperature of about 24° F. had occurred. The foam covered plants survived the frost without appreciable injury. The reading on the minimum temperature thermometer that was in the foam covered flat was observed to be about 42° F., the same as the temperature of the preceding evening when the flats had been set out.

Results similar to the foregoing may be observed when the invention is practiced with trees, bushes, flowers and other botanical plants and when other adaptable cellulose ether derivatives or polyvinyl alcohol or other suitable polymeric substances, including proteinous materials, are utilized in and for the foam-providing compositions and the foams generated therefrom.

Certain changes and modifications in the present invention can obviously be made in its practice without departing substantially from its intended spirit and scope. As a consequence, the invention is not intended to be limited or otherwise restricted to or by the convenient and preferred embodiments thereof with which the foregoing description and specification are illustrated. Rather, it is to be interpreted and construed in the light of what is set forth and defined in the hereto appended claims.

What is claimed is:

1. Method for shielding botanical plants from frostation which comprises covering at least the susceptible portions of said plants when danger of frost is imminent with an enveloping, protective layer having a thickness of at least about half an inch of a stable, long-lasting foam that has a longevity of at least about four hours and which has been generated from an aqueous, spumescent, foam-providing composition, said foam being generated from a dilute aqueous solution containing between about 0.25 and 5.0 percent by weight, based on the weight of the solution, of a long-chain, water-soluble polymeric material selected from the group consisting of non-polar cellulose ether derivatives that are adapted to provide one percent by weight aqueous solutions having surface tensions at room temperature beneath about 60 dynes per centimeter; polyvinyl alcohol; polyvinylpyrrolidone; water-soluble copolymers of vinyl pyrrolidone; hydrolyzed polyacrylonitrile; copolymers of vinyl acetate and maleic acid; copolymers of vinyl methyl ether and maleic anhydride; and mixtures thereof; said aqueous solution containing a minor proportion of between about 0.05 and 10 percent by weight of saponin, based on the weight of the solution.

2. The method of claim 1, wherein substantially all of each plant being covered is enveloped by the foam.

3. The method of claim 1, wherein the longevity of the foam is overnight.

4. The method of claim 1, wherein the volume of the foam is at least about 10 times the volume of the composition from which it was generated.

5. Method for shielding botanical plants from frostation which comprises covering at least the susceptible portions of said plants when danger of frost is imminent with an enveloping, protective layer having a thickness of at least about half an inch of a stable, long-lasting foam that has a longevity of at least about four hours and which has been generated from an aqueous, spumescent, foam-providing composition, said foam being generated from a dilute aqueous solution of a long-chain, water-soluble polymeric material selected from the group consisting of non-polar cellulose ether derivatives that are adapted to provided one percent by weight aqueous solutions having surface tensions at room temperatures beneath about 60 dynes per centimeter; polyvinyl alcohol, polyvinylpyrrolidone; water-soluble copolymers of vinyl pyrrolidone; hydrolyzed polyacrylonitrile; copolymers of vinyl acetate and maleic acid; copolymers of vinyl methyl ether and maleic anhydride; and mixtures thereof; said aqueous solution containing a minor proportion of saponin.

6. A method in accordance with the method set forth in claim 1, wherein the foam is generated from a methyl ether of cellulose having a viscosity less than about 100 centipoises.

References Cited in the file of this patent

UNITED STATES PATENTS

| | | |
|---|---|---|
| 1,995,853 | Hunsaker | Mar. 26, 1935 |
| 2,088,085 | Gross | July 27, 1937 |
| 2,547,261 | Geiger | Apr. 3, 1951 |

FOREIGN PATENTS

| | | |
|---|---|---|
| 485,194 | Great Britain | May 16, 1938 |
| 486,113 | Great Britain | May 27, 1938 |
| 702,952 | Great Britain | Jan. 27, 1954 |
| 215,864 | Switzerland | Nov. 1, 1941 |

OTHER REFERENCES

Ser. No. 340,363, Lowenstein (A. P. C.), published Apr. 27, 1943.

"The New Methocel" (Dow Chemical Company), published 1949; pages 1, 2, 3 are relied on.